(12) United States Patent
Tang

(10) Patent No.: US 12,376,676 B1
(45) Date of Patent: Aug. 5, 2025

(54) DETACHABLE FOLDING BOOKSHELF

(71) Applicant: Ping Tang, Guangdong (CN)

(72) Inventor: Ping Tang, Guangdong (CN)

( * ) Notice: Subject to any disclaimer, the term of this patent is extended or adjusted under 35 U.S.C. 154(b) by 0 days.

(21) Appl. No.: 19/010,215

(22) Filed: Jan. 6, 2025

(51) Int. Cl.
| | |
|---|---|
| A47B 65/00 | (2006.01) |
| A47B 43/00 | (2006.01) |
| A47B 91/02 | (2006.01) |
| A47F 5/10 | (2006.01) |
| A47F 7/00 | (2006.01) |
| D06F 57/08 | (2006.01) |
| F16M 11/38 | (2006.01) |

(52) U.S. Cl.
CPC .............. *A47B 65/10* (2014.12); *A47B 43/00* (2013.01); *A47B 91/022* (2013.01); *A47F 5/10* (2013.01); *A47F 7/00* (2013.01); *D06F 57/08* (2013.01); *F16M 11/38* (2013.01)

(58) Field of Classification Search
CPC ....... A47B 65/10; A47B 43/00; A47B 91/022; A47B 65/00; D06F 57/12; D06F 57/10; D06F 57/06; D06F 57/08; A47F 5/10; A47F 7/00; A47F 3/004; F16M 11/38; F16M 11/046; F16M 11/42
See application file for complete search history.

(56) References Cited

U.S. PATENT DOCUMENTS

| | | | | |
|---|---|---|---|---|
| RE3,710 E * | 11/1869 | Stone | ............................ | 248/166 |
| 196,679 A * | 10/1877 | Lane | ........................ | E06C 1/54 |
| | | | | 182/157 |
| 218,680 A * | 8/1879 | McCabe | ............... | E04B 1/3441 |
| | | | | 52/109 |
| 485,068 A * | 10/1892 | Sugg | ........................ | A47B 1/04 |
| | | | | 211/33 |
| 539,672 A * | 5/1895 | Decker | ................... | B66F 11/04 |
| | | | | 52/109 |
| 608,442 A * | 8/1898 | Cronmiller | ............ | F16M 11/20 |
| | | | | 248/166 |
| 612,479 A * | 10/1898 | Casey | .................. | A47G 25/746 |
| | | | | 135/145 |
| 716,614 A * | 12/1902 | Bagge | .................. | A47B 96/061 |
| | | | | 211/105 |
| 814,165 A * | 3/1906 | Rea | ........................ | A47B 87/02 |
| | | | | 211/105 |
| 1,035,552 A * | 8/1912 | Doering | .................. | A47F 7/145 |
| | | | | 211/202 |
| 1,095,391 A * | 5/1914 | Fogle | ...................... | B66F 11/04 |
| | | | | 182/69.5 |
| 1,109,275 A * | 9/1914 | Andrews | ............... | A47G 25/746 |
| | | | | 211/202 |
| 1,589,743 A * | 6/1926 | Clary | ........................ | E06C 7/46 |
| | | | | 182/205 |
| 1,912,425 A * | 6/1933 | Baumer | ................ | E04H 15/003 |
| | | | | 135/145 |
| 1,955,769 A * | 4/1934 | Reynolds | .................. | G09F 5/02 |
| | | | | 211/130.1 |

(Continued)

*Primary Examiner* — Devin K Barnett
(74) *Attorney, Agent, or Firm* — S.J. Intellectual Property LTD.

(57) ABSTRACT

Provided in the present disclosure is a detachable folding bookshelf, including: a base having a storage cavity, and a folding support frame detectably assembled with the base. The folding support frame has an unfolded state and a folded state, and when in the folded state, the folding support frame is capable of being stored within the storage cavity.

7 Claims, 12 Drawing Sheets

(56) References Cited

U.S. PATENT DOCUMENTS

| | | | | |
|---|---|---|---|---|
| 2,445,403 A * | 7/1948 | Mayerman | D06F 58/14 | 211/202 |
| 2,562,982 A * | 8/1951 | Cieri | A47L 19/04 | 211/41.6 |
| 2,710,241 A * | 6/1955 | Lieberman | A47B 47/05 | 312/351 |
| 2,781,766 A * | 2/1957 | Krieger | E04H 15/50 | 4/476 |
| 2,958,424 A * | 11/1960 | Bigatti | A47L 19/00 | 211/104 |
| 3,007,539 A * | 11/1961 | Brewer | G10K 11/20 | 52/109 |
| 3,127,020 A * | 3/1964 | Bibb | A47B 96/04 | 403/374.4 |
| 3,133,645 A * | 5/1964 | Cecil | D06F 57/10 | 211/202 |
| 3,375,624 A * | 4/1968 | Mikulin | E04C 3/005 | 52/109 |
| 3,435,570 A * | 4/1969 | Berry | E04H 12/185 | 52/645 |
| 3,570,798 A * | 3/1971 | Squibb | A47B 96/1441 | 211/187 |
| 3,596,735 A * | 8/1971 | Denier | B66F 11/042 | 182/69.5 |
| 3,612,284 A * | 10/1971 | Stoltz | D06F 57/12 | 211/105 |
| 3,700,070 A * | 10/1972 | King | E04G 1/22 | 182/69.5 |
| 3,796,282 A * | 3/1974 | Denier | E04G 1/22 | 52/109 |
| 3,801,174 A * | 4/1974 | Kanarr | A47G 25/746 | 312/297 |
| 4,070,807 A * | 1/1978 | Smith, Jr. | B66F 7/0675 | 182/69.5 |
| 4,088,203 A * | 5/1978 | Smith, Jr. | B66F 11/042 | 182/69.5 |
| 4,126,288 A * | 11/1978 | De Sisto | F16B 7/0446 | 248/165 |
| 4,130,178 A * | 12/1978 | Smith, Jr. | B66F 7/08 | 182/69.5 |
| 4,131,205 A * | 12/1978 | Malecki | D06F 57/10 | 211/202 |
| 4,168,006 A * | 9/1979 | Yamamoto | D06F 57/00 | 211/1.51 |
| 4,552,270 A * | 11/1985 | Lentz | B62H 3/12 | 211/208 |
| 4,828,123 A * | 5/1989 | Basore | D06F 57/10 | 248/176.1 |
| 4,930,598 A * | 6/1990 | Murrill | E04G 1/22 | 182/69.5 |
| 5,121,765 A * | 6/1992 | MacMorris, Jr. | E04H 15/505 | 52/109 |
| 5,145,029 A * | 9/1992 | Blasdell, Jr. | E04G 1/22 | 182/69.5 |
| 5,163,262 A * | 11/1992 | Adams | B64G 99/00 | 52/645 |
| 5,390,803 A * | 2/1995 | McAllister | A47B 57/265 | 211/187 |
| 5,413,068 A * | 5/1995 | Segal | A01K 15/025 | 119/706 |
| 5,476,050 A * | 12/1995 | Zimmer | B66F 11/042 | 254/122 |
| 6,394,292 B1 * | 5/2002 | Sabounjian | D06F 57/10 | 211/202 |
| 6,488,252 B1 * | 12/2002 | Ibrahim | A47B 23/044 | 248/441.1 |
| D533,735 S * | 12/2006 | Carlsson | D6/682.2 | |
| D537,276 S * | 2/2007 | Kelman | D6/682.2 | |
| 7,475,785 B1 * | 1/2009 | Kidd | A47L 19/02 | 211/85.15 |
| D606,669 S * | 12/2009 | Giorgi | D25/64 | |
| 8,100,274 B2 * | 1/2012 | Trowsdale | D06F 57/08 | 211/195 |
| 8,371,088 B2 * | 2/2013 | Merrifield | E04C 3/005 | 52/109 |
| D707,472 S * | 6/2014 | Wehner | D6/675.1 | |
| D708,873 S * | 7/2014 | Wehner | D06F 57/10 | D6/675.2 |
| D722,795 S * | 2/2015 | Wehner | D6/675.1 | |
| 9,198,508 B1 * | 12/2015 | Kufel | A47B 47/024 | |
| 9,765,470 B1 * | 9/2017 | Dufresne | F16M 11/38 | |
| 10,092,095 B2 * | 10/2018 | Zhu | A47B 43/00 | |
| 10,400,943 B2 * | 9/2019 | Lau | F16M 11/38 | |
| 10,527,221 B2 * | 1/2020 | Grappe | B62B 5/0033 | |
| 10,897,993 B2 | 1/2021 | DeSmet et al. | | |
| 11,284,718 B1 | 3/2022 | Schneider | | |
| 11,498,819 B2 * | 11/2022 | Bruno | B66F 7/0666 | |
| 11,833,659 B2 * | 12/2023 | Fan | B25H 3/028 | |
| 11,965,349 B2 * | 4/2024 | Shropshire | B60S 9/02 | |
| 12,077,899 B2 * | 9/2024 | Howard | D06F 57/08 | |
| 2004/0074858 A1 * | 4/2004 | Thuma | D06F 57/00 | 211/202 |
| 2004/0104190 A1 * | 6/2004 | Trowsdale | D06F 57/10 | 211/202 |
| 2007/0131633 A1 * | 6/2007 | Ferm | A47F 5/16 | 211/126.6 |
| 2011/0180503 A1 * | 7/2011 | Kaluzavich | A47B 91/12 | 248/188.4 |
| 2015/0041420 A1 * | 2/2015 | Zelek | A47F 5/10 | 211/195 |
| 2018/0106109 A1 * | 4/2018 | Boller | E06C 1/383 | |
| 2021/0000254 A1 | 1/2021 | Liss et al. | | |
| 2021/0137263 A1 | 5/2021 | Lin et al. | | |
| 2022/0299258 A1 * | 9/2022 | Cheng | F25D 25/02 | |

* cited by examiner

DETACHABLE FOLDING BOOKSHELF

TECHNICAL FIELD

The present disclosure relates to the field of bookshelf technology, particularly to a detachable folding bookshelf.

BACKGROUND

A bookshelf is a device specifically designed for storing books. Folding bookshelves are widely used due to their convenience in storage and small space occupation. Typically, a base and a support frame of a folding bookshelf are integrally connected, which prevents the support frame and the base from being detached from storage, resulting in the support frame still occupying space even when folded.

SUMMARY

An objective of the present disclosure is to provide a detachable folding bookshelf, which realizes the detachable assembly between a folding support and a base. The detachable folding bookshelf not only facilitates easy folding and storage, convenient assembly and disassembly and structure stability, but also allows for further storage of the folding support, thereby occupying less space after being folded and stored.

To achieve the above objective, the present disclosure provides the following technical solution: a detachable folding bookshelf, comprising: a base having a storage cavity, and a folding support frame detectably assembled with the folding support frame. The folding support frame has an unfolded state and a folded state, and when in the folded state, the folding support frame can be stored within the storage cavity.

In one embodiment, the folding support frame comprises a first folding assembly, which is inserted into and assembled with the base; and a second folding assembly, which is connected to the side of the first folding assembly away from the base and can be unfolded and folded synchronously with the first folding assembly.

In one embodiment, the first folding assembly comprises a first folding plate with one end inserted into and assembled with the base and the other end rotatably connected to the second folding assembly, the first folding plate having a first mounting opening; a second folding plate with one end rotatably connected to the second folding assembly and the other end penetrating through the first mounting opening to be inserted into and assembled with the base, wherein the first folding plate intersects with the second folding plate, and middle portions of the first folding plate and the second folding plate overlap; and a first hinge member penetrating through overlapping portions of the first folding plate and the second folding plate, enabling the first folding plate and the second folding plate to be rotatably assembled.

In one embodiment, insertion slots are provided on the side of the base proximal to the first folding assembly, the first folding plate and the second folding plate are both provided with insertion portions, and the insertion portions are adapted to the insertion slots.

In one embodiment, the second folding assembly comprises a third folding plate with one end rotatably connected to the second folding plate, the third folding plate having a second mounting opening; a fourth folding plate with one end penetrating through the second mounting opening to be rotatably connected to the first folding plate, wherein the third folding plate intersects with the fourth folding plate, and middle portions of the third folding plate and the fourth folding plate overlap; and a second hinge member penetrating through overlapping portions of the third folding plate and the fourth folding plate, enabling the third folding plate and the fourth folding plate to be rotatably assembled.

In one embodiment, first connecting portions are provided at the ends of the first folding plate and the second folding plate away from the base, second connecting portions are provided on the sides of the third folding plate and the fourth folding plate proximal to the base, and the first connecting portions and the second connecting portions are rotatably connected, so that the first folding assembly and the second folding assembly can be unfolded or folded synchronously.

In one embodiment, the folding support frame further comprises at least one third folding assembly, one end of the third folding assembly is rotatably connected to the first connecting portions, the other end of the third folding assembly is rotatably connected to the second connecting portions, and the third folding assembly can be unfolded or folded synchronously with the first folding assembly and the second folding assembly.

In one embodiment, the third folding assembly comprises a fifth folding plate with one end rotatably connected to the second folding plate and the other end rotatably connected to the fourth fifth folding plate, the fifth folding plate having a third mounting opening; a sixth folding plate with one end rotatably connected to the first folding plate and the other end penetrating through the third mounting opening to be connected to the third folding plate, wherein the sixth folding plate intersects with the fifth folding plate, and middle portions of the sixth folding plate and the fifth folding plate overlap; and a third hinge member penetrating through overlapping portions of the fifth folding plate and the sixth folding plate, enabling the fifth folding plate and the sixth folding plate to be rotatably assembled.

In one embodiment, movable baffles are further comprised, wherein the movable baffles are rotatably assembled with the folding support frame, and when the folding support frame is in the unfolded state, the movable baffles can be unfolded relative to the folding support frame to define V-shaped accommodating spaces together with the folding support frame, so as to increase the storage capacity of the bookshelf.

In one embodiment, support feet are arranged on the side of the base away from the folding support frame, and the support feet are rotatable relative to the base to adjust the support height.

It can be known from the analysis that the present disclosure discloses a detachable folding bookshelf, whereby arranging the base and the folding support frame to be detectably connected and arranging the folding support frame for storage in a folded state on the base 1, the folding bookshelf is not only easy to fold and store, convenient to assemble and disassemble and stable in structure, but also enables further storage of the folding support frame, thereby occupying less space after being folded and stored.

The technical solution of the present disclosure is simple in structure, easy to store, convenient to assemble and disassemble, and stable in structure, and occupies less space after being folded and stored.

BRIEF DESCRIPTION OF THE DRAWINGS

The accompanying drawings, which constitute a part of this disclosure, are used for providing a further understanding of the present disclosure; and illustrative embodiments of the present disclosure and descriptions thereof are intended to explain the present disclosure and are not construed to unduly limit the present disclosure. In the drawings.

REFERENCE NUMERALS

Figure 1:
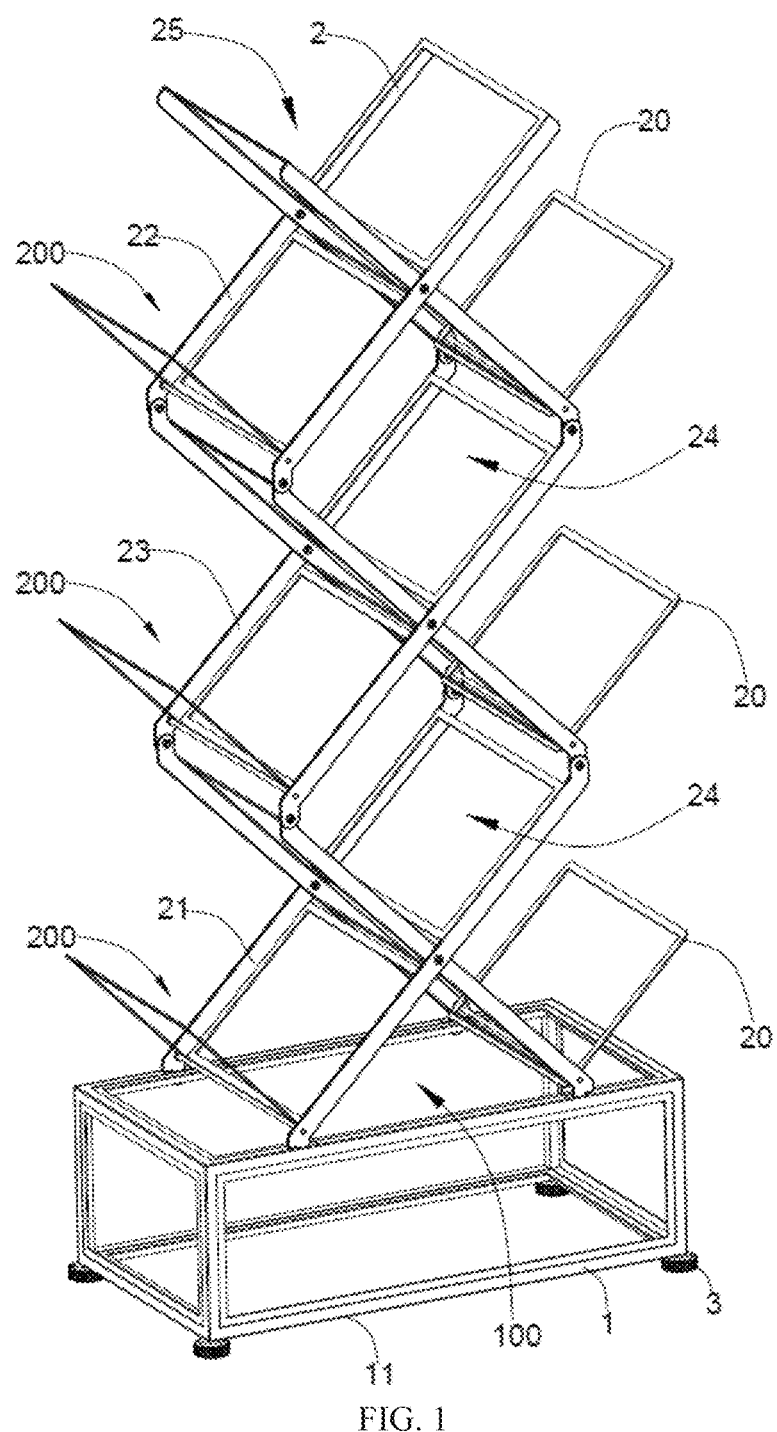
FIG. 1 is a schematic view of an overall structure of a bookshelf according to an embodiment of the present disclosure.

1. Base; 10. Storage cavity; 11. Frame; 110. Insertion slot; 2. Folding support frame; 20. Movable baffle; 200. V-shaped accommodating space;
201. Baffle frame; 202. Rotary shaft; 21. First folding assembly; 211. First folding plate; 2110. First mounting opening; 2111. First lower mounting frame; 2112. First upper mounting frame; 2113. First connecting plate; 212. Second folding plate; 2121. Second lower mounting frame; 2122. Second upper mounting frame; 2123. Second connecting plate; 213. First hinge member; 214. Insertion portion; 215. First connecting portion; 22. Second folding assembly; 221. Third folding plate; 2210. Second mounting opening; 2211. Third lower mounting frame; 2212. Third upper mounting frame; 2213. Third connecting plate; 222. Fourth folding plate; 2221. Fourth lower mounting frame; 2222. Fourth upper mounting frame; 2223. Fourth connecting plate; 223. Second hinge member; 224. Second connecting portion; 23. Third folding assembly; 231. Fifth folding plate; 2310. Third mounting opening; 2311. Fifth lower mounting frame; 2312. Fifth upper mounting frame; 2313. Fifth connecting plate; 232. Sixth folding plate; 2321. Sixth lower mounting frame; 2322. Sixth upper mounting frame; 2323. Sixth connecting plate; 233. Third hinge member; 234. Third connecting portion; 235. Fourth connecting portion; 3. Support foot; 4. Mesh structure.

DETAILED DESCRIPTION OF EMBODIMENTS

The present disclosure will be described in detail below with reference to the accompanying drawings and embodiments. Each example is provided by way of an explanation of the present disclosure, not a limitation to the present disclosure. In fact, those skilled in the art will recognize that modifications and variations can be made in the present disclosure without departing from the scope or spirit of the present disclosure. For example, features shown or described as part of one embodiment may be used in another embodiment to produce yet another embodiment. Therefore, it is intended that the present disclosure includes such modifications and variations as come within the scope of the appended claims and their equivalents.

In the description of the present disclosure, the orientations or positional relationships indicated by the terms "longitudinal", "transverse", "upper", "lower", "front", "rear", "left", "right", "vertical", "horizontal", "top", "bottom", etc. are based on the orientations or positional relationships shown in the drawings, and are only for the convenience of describing the present disclosure, rather than requiring that the present disclosure must be constructed and operated in a specific orientation, so they cannot be interpreted as limitations to the present disclosure. The terms "linked", "connected" and "arranged" used in the present disclosure should be understood in a broad sense, for example, it can be fixedly connected or detachably connected, it can be directly connected or indirectly connected through an intermediate component, and it also can be a cable connection, a radio connection or a wireless communication signal connection. Those of ordinary skill in the art can understand the specific meanings of the above terms according to specific situations.

One or more examples of the present disclosure are shown in the accompanying drawings. The detailed description uses numerical and letter signs to refer to features in the drawings. Similar or like signs in the drawings and descriptions have been used to refer to similar or like parts of the present disclosure. As used herein, the terms "first", "second", "third" and the like are used interchangeably to distinguish one member from another and are not intended to denote the location or importance of individual members.

Figure 2:
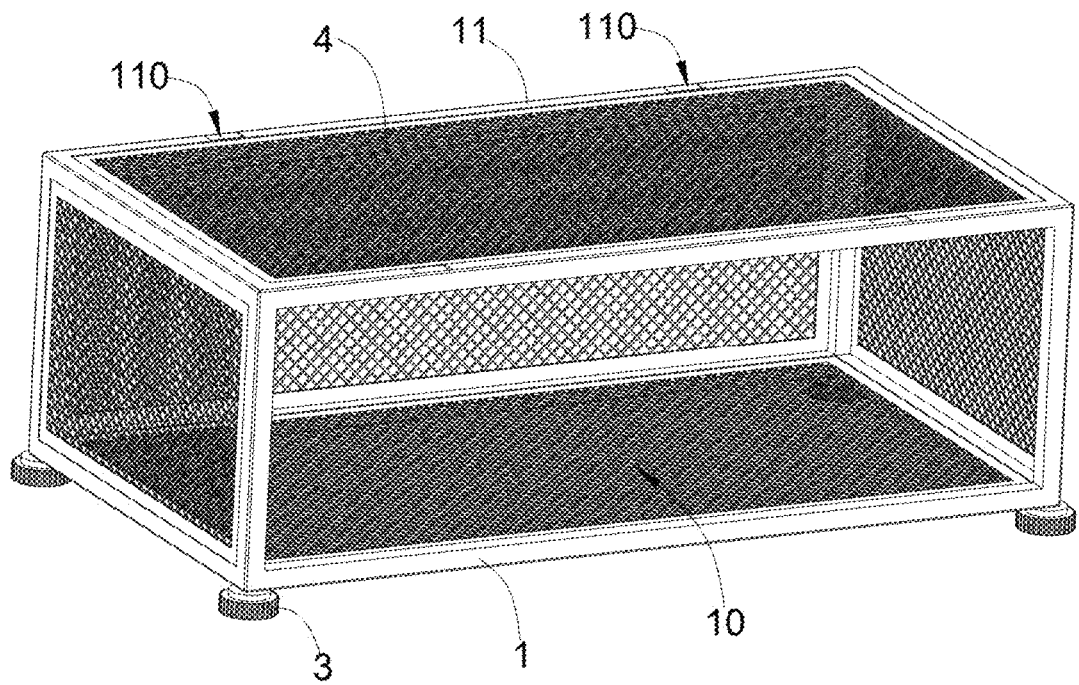
FIG. 2 is a structural schematic view of a base, a mesh structure and support feet according to an embodiment of the present disclosure.
Figure 3:
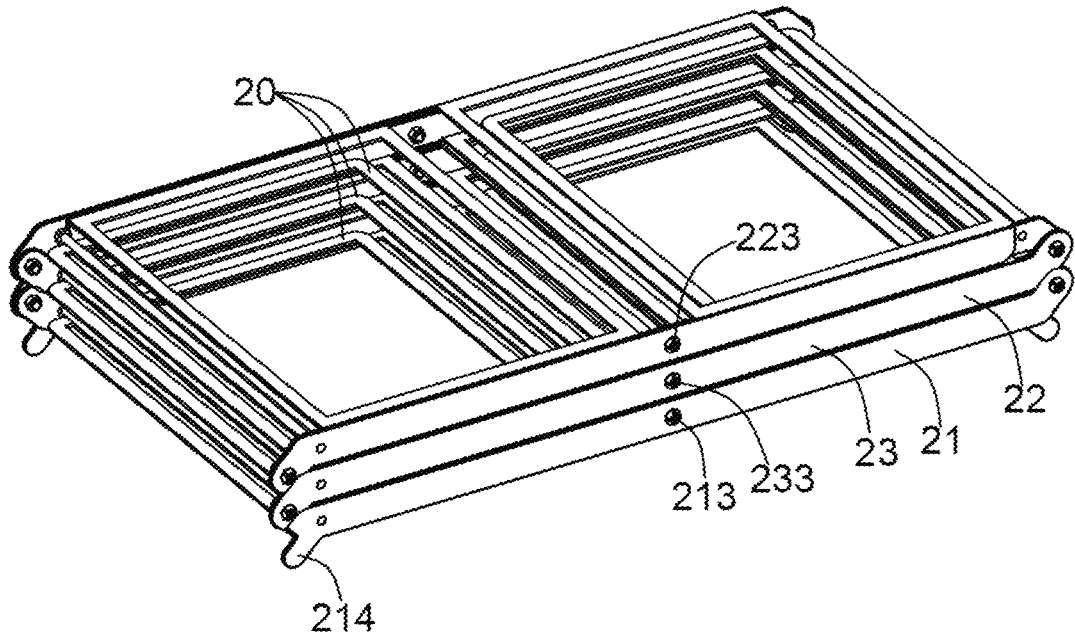
FIG. 3 is a structural schematic view of a folding support frame after being folded according to an embodiment of the present disclosure.
Figure 4:
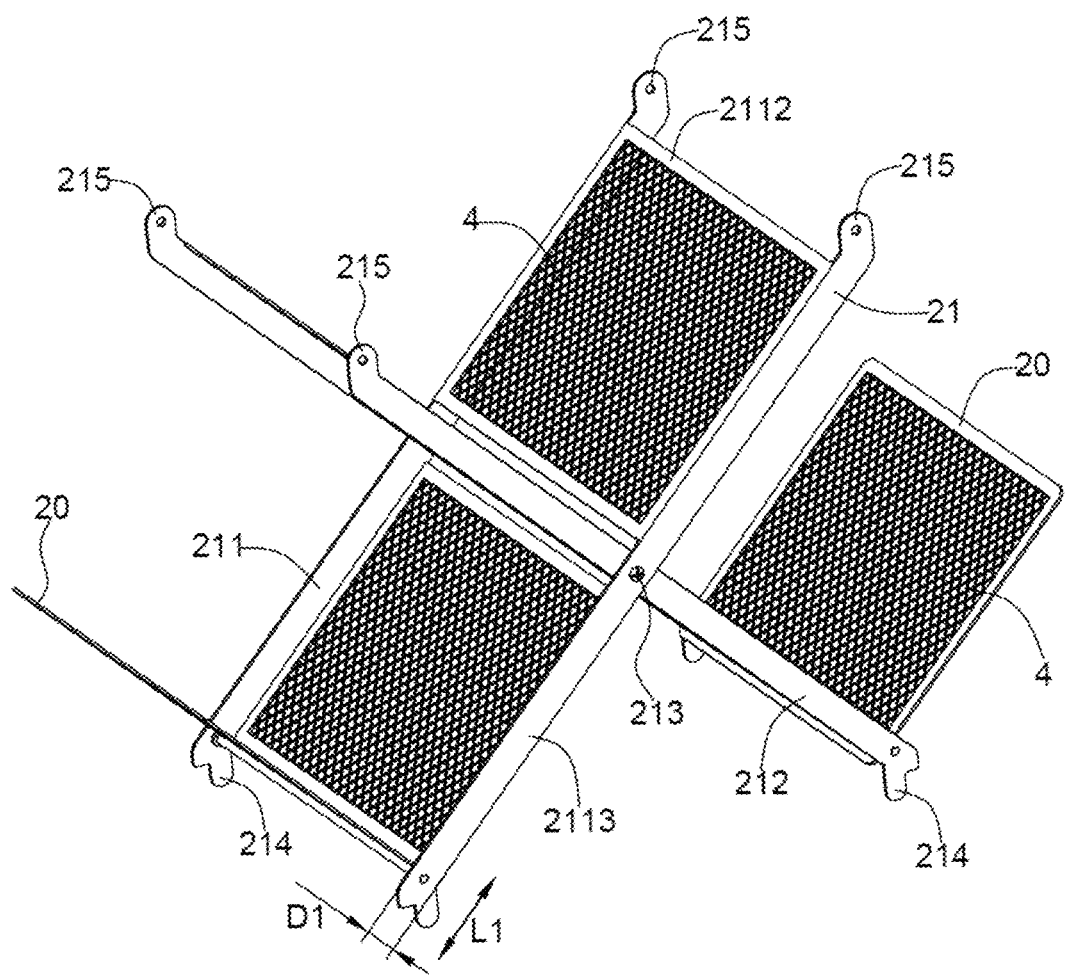
FIG. 4 is a structural schematic view of a first folding assembly according to an embodiment of the present disclosure.
Figure 5:
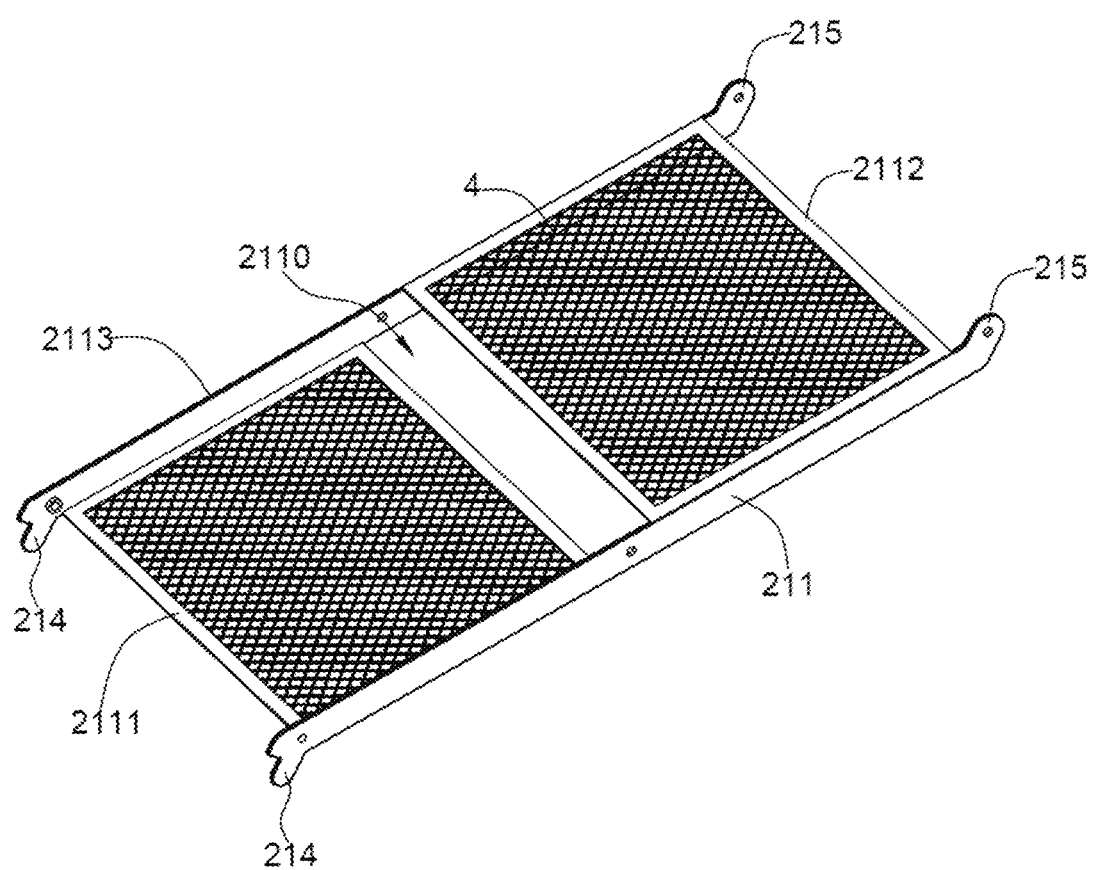
FIG. 5 is a structural schematic view of a first folding assembly according to an embodiment of the present disclosure.
Figure 6:
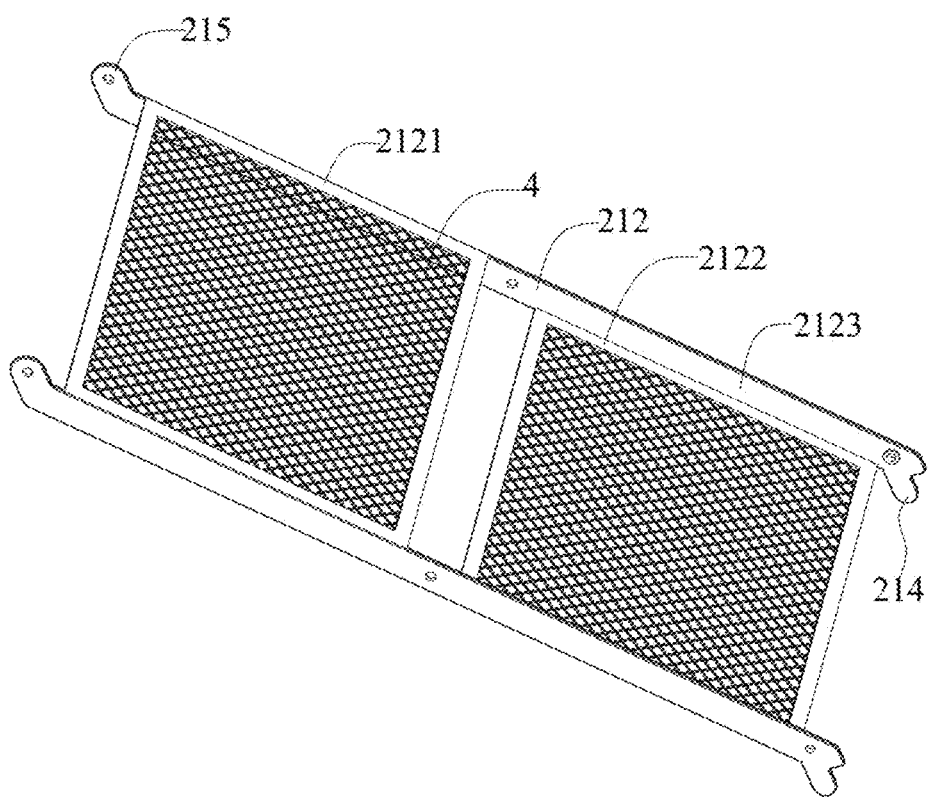
FIG. 6 is a structural schematic view of a second folding plate according to an embodiment of the present disclosure.
Figure 7:
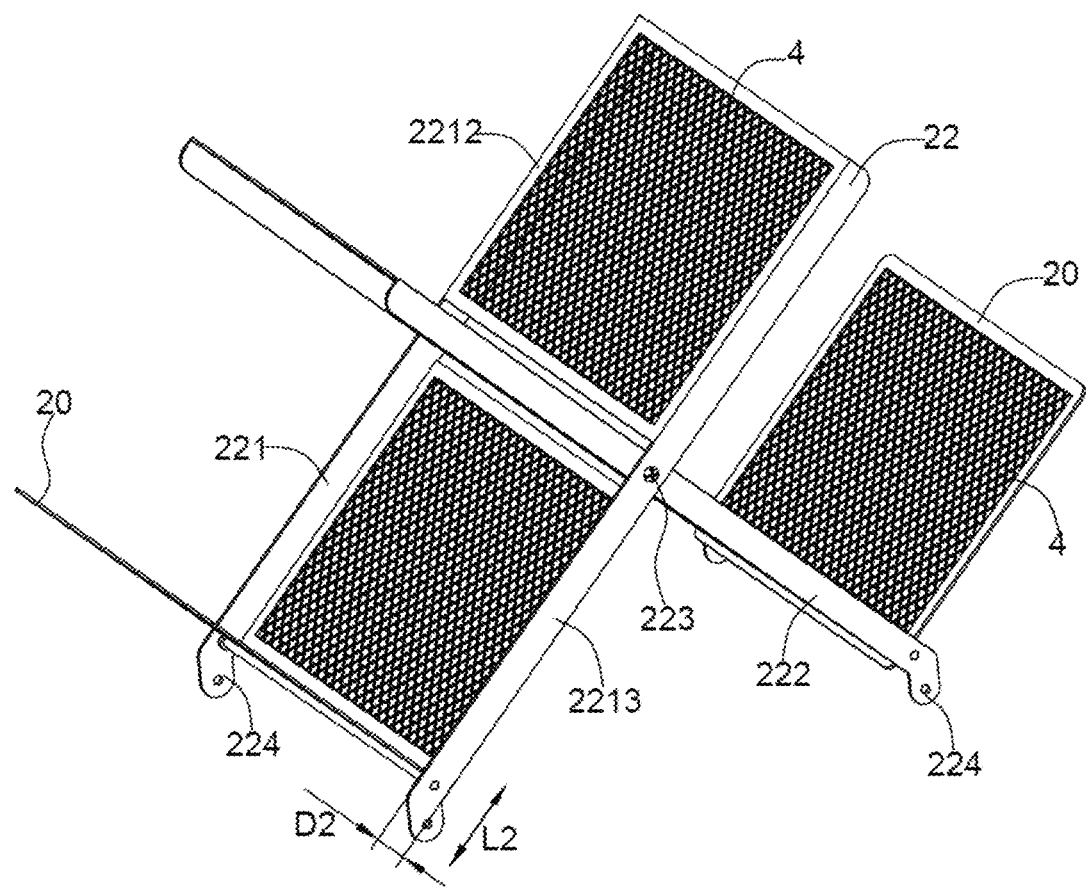
FIG. 7 is a structural schematic view of a second folding assembly according to an embodiment of the present disclosure.
Figure 8:
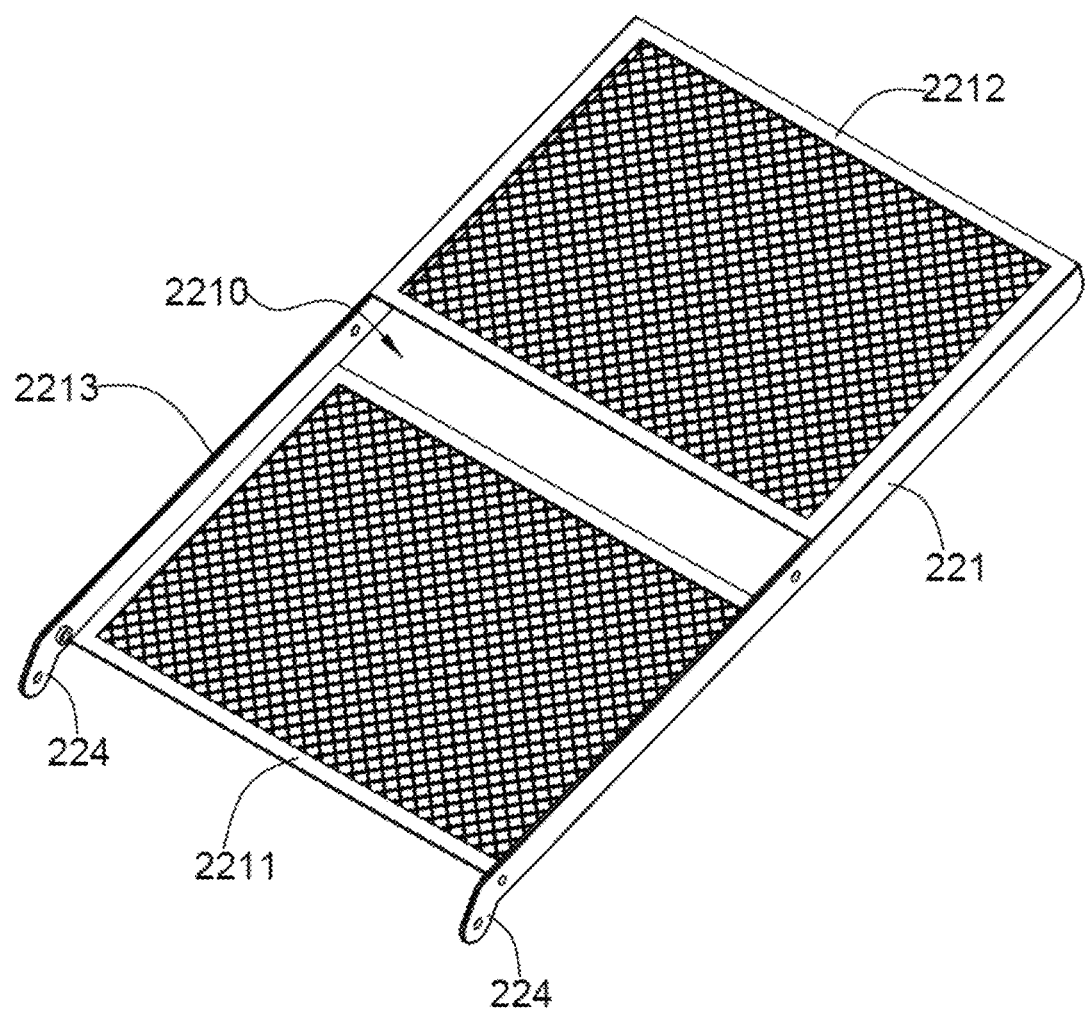
FIG. 8 is a structural schematic view of a third folding assembly according to an embodiment of the present disclosure.
Figure 9:
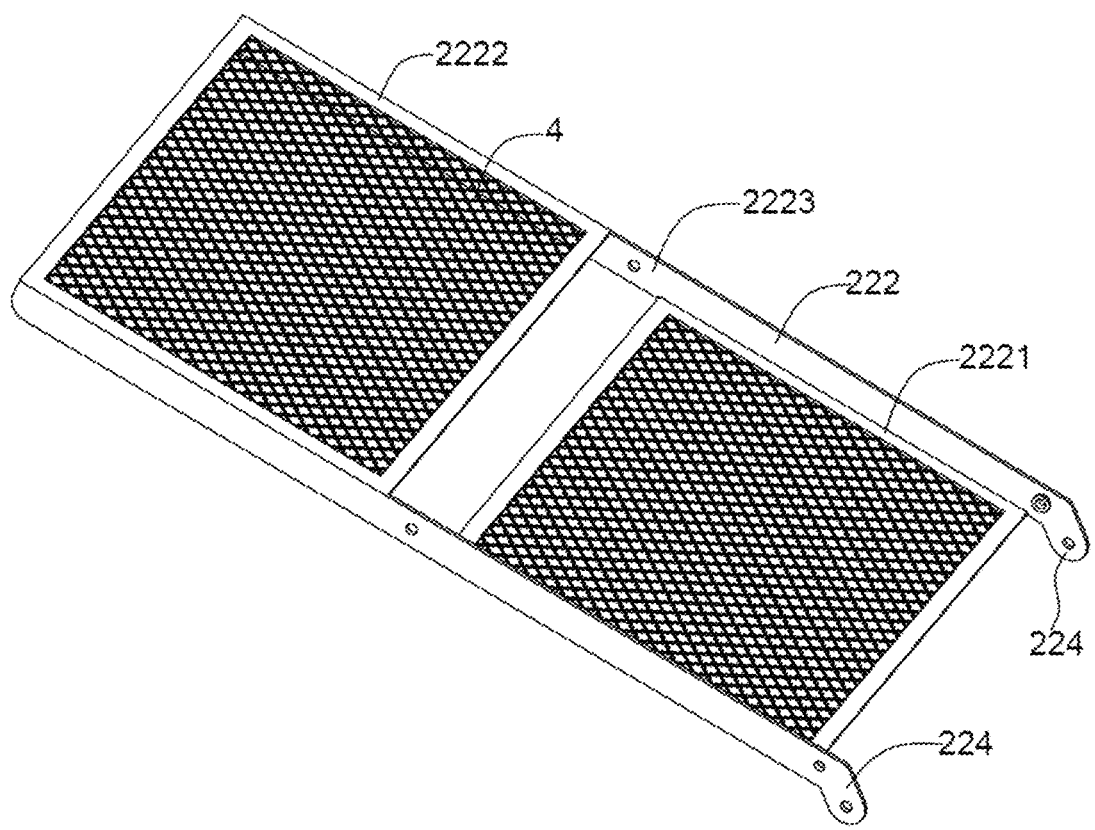
FIG. 9 is a structural schematic view of a fourth folding plate according to an embodiment of the present disclosure.
Figure 10:
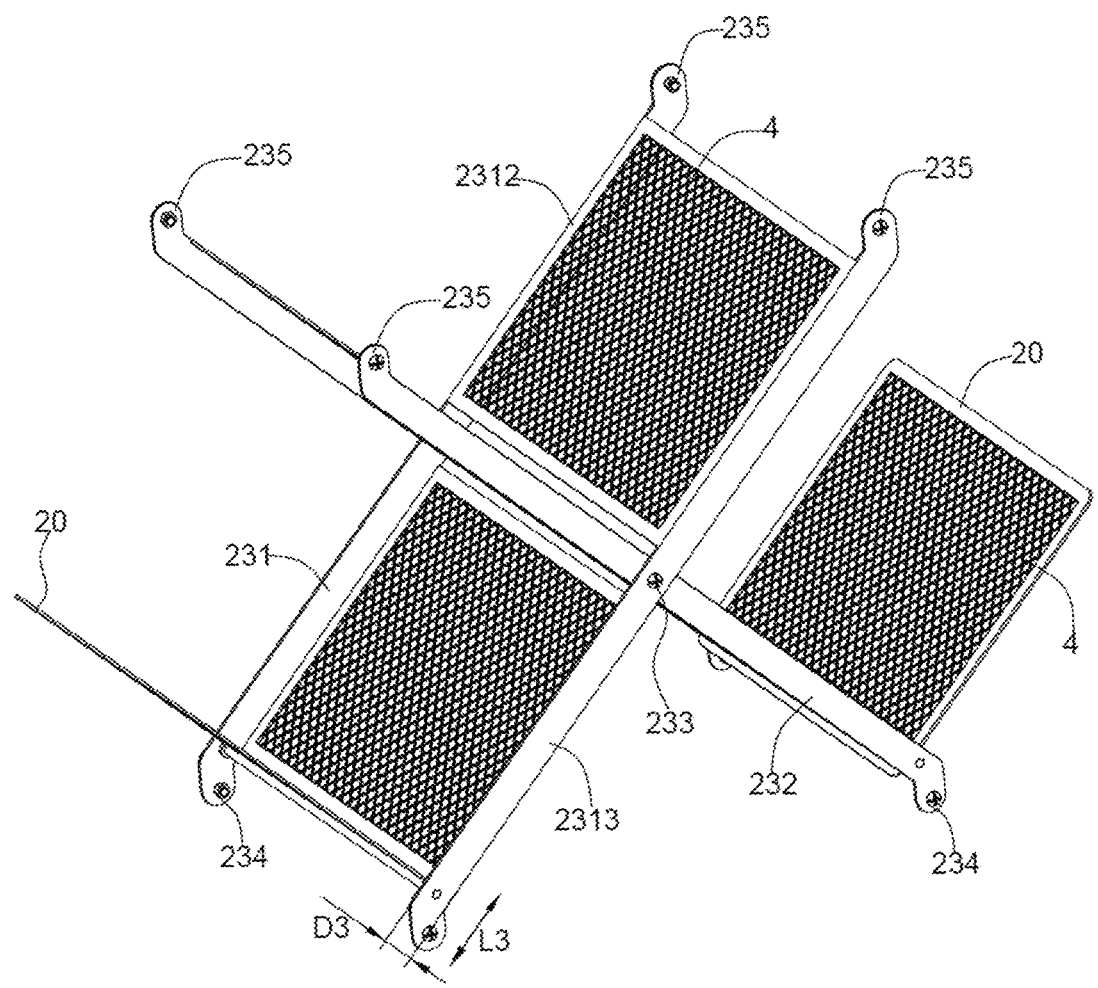
FIG. 10 is a structural schematic view of a third folding assembly according to an embodiment of the present disclosure.
Figure 11:
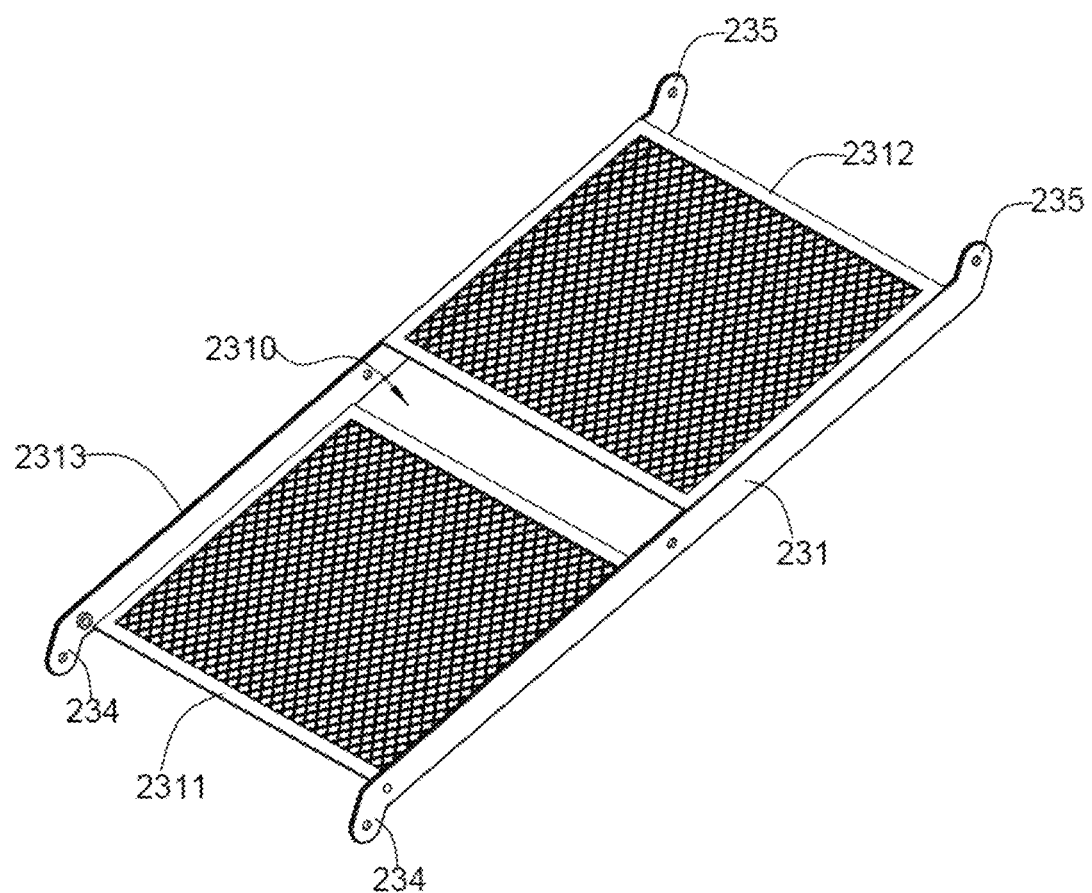
FIG. 11 is a structural schematic view of a fifth folding assembly according to an embodiment of the present disclosure.
Figure 12:
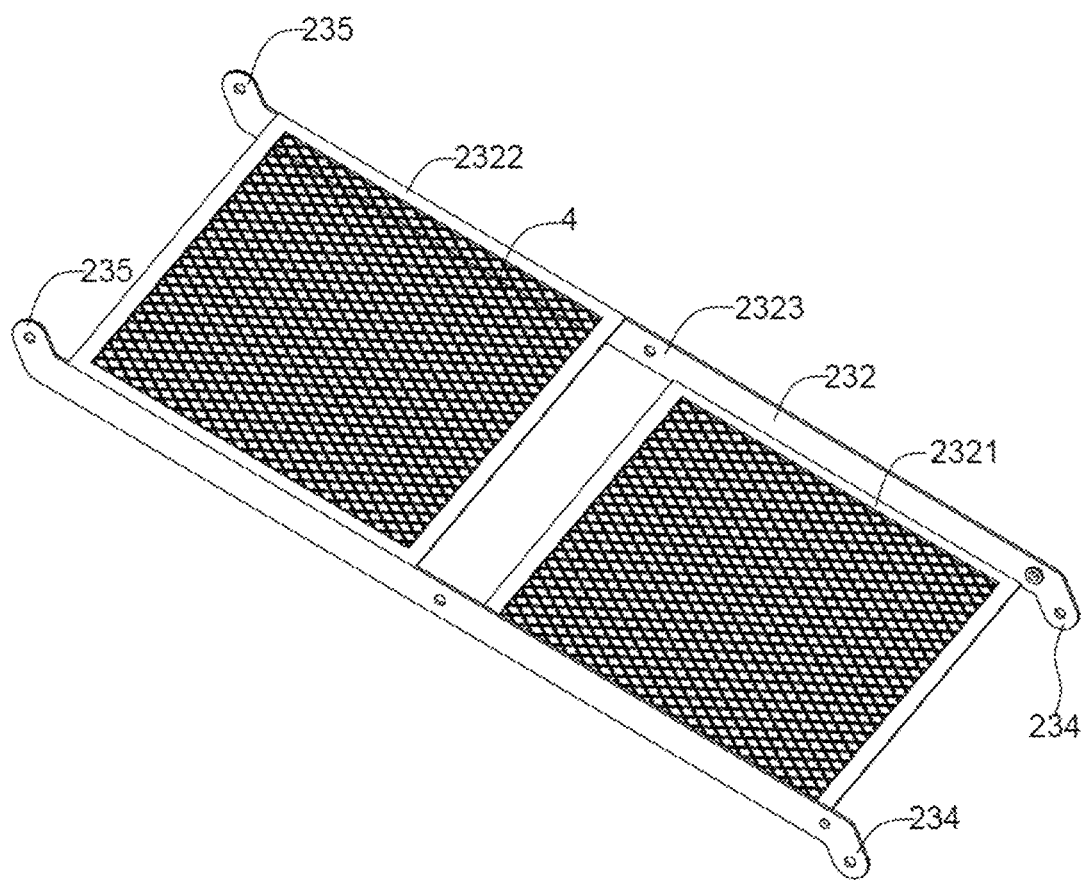
FIG. 12 is a structural schematic view of a sixth folding plate according to an embodiment of the present disclosure.
Figure 13:
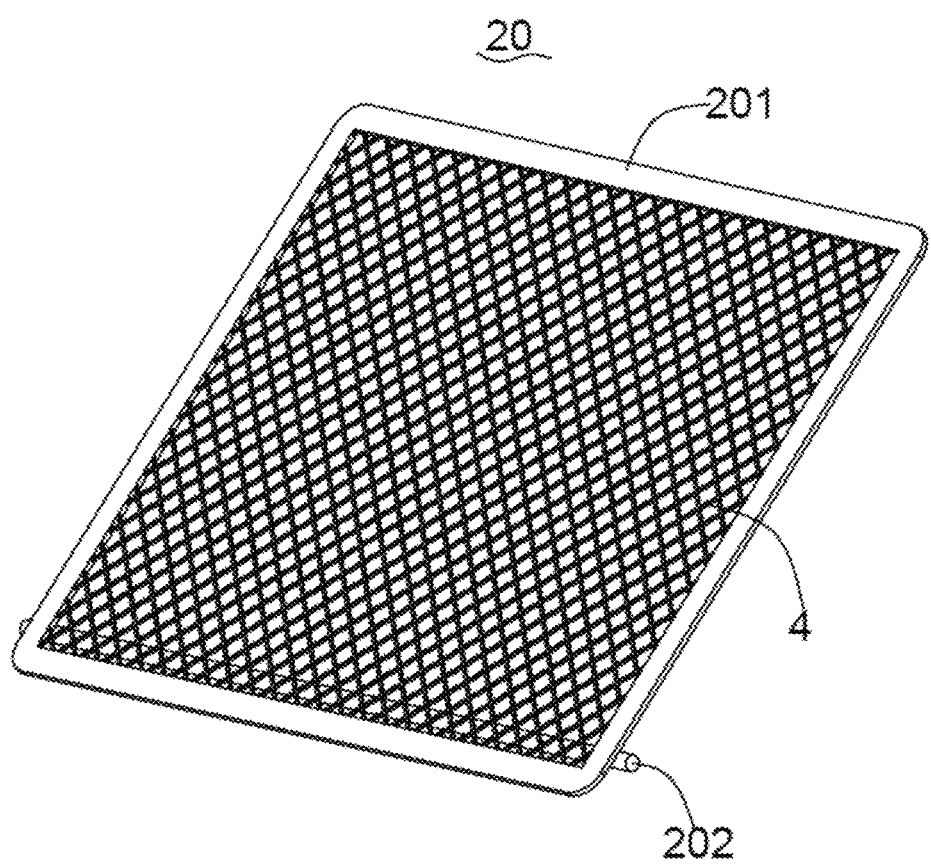
FIG. 13 is a structural schematic view of a movable baffle according to an embodiment of the present disclosure.

Referring to FIGS. 1 to 3, the present embodiment relates to a detachable folding bookshelf, including a base 1 and a folding support frame 2. Specifically, the base 1 has a storage cavity 10. The folding support frame 2 and the base 1 are detachably assembled.

It should be noted that the folding support frame 2 has an unfolded state and a folded state. When in the unfolded state, the folding support frame 2 is mounted on the base 1 and unfolded in a tree-like shape to store books; and when in the folded state, the folding support frame 2 can be detached from the base 1, and the detached folding support frame 2 can be stored in the storage cavity 10. With this configuration, the bookshelf not only allows for easy folding and storage, quick assembly and disassembly, and structure stability, but also further enables the folding plate 2 to be stored, thereby occupying less space after being folded and stored.

In one embodiment, the base 1 includes a frame 11 and mesh structures 4. The frame 11 is in a cuboid shape. The mesh structures 4 are fixedly connected to the frame 11, and a mesh structure 4 is not provided on a front side wall face of the frame 11 to facilitate the picking and placing of the detached folding support frame 2 in a folded state, thereby facilitating the storage of the folding support frame 2.

In one embodiment, support feet 3 are arranged on the side of the frame 11 away from the folding support frame 2. The support feet 3 can rotate relative to the frame 11 so as to adjust the support height of the support feet 3 and stably support the base 1.

In this embodiment, four threaded holes are provided at four corners of the frame 11 respectively, threaded studs adapted to the threaded holes are arranged on the support feet 3, and the support height of the support feet 3 is adjusted by rotating to adjust the length of the threaded studs into the threaded holes. The bottom of each support foot 3 is a disk-shaped structure, so as to increase the support area and provide stable support. In other embodiments, the support feet 3 may also be universal wheels having threaded studs, and such an arrangement can facilitate the transportation of the bookshelf.

Referring to FIGS. 1, 2, 4 to 6, in one embodiment, the folding support frame 2 includes a first folding assembly 21 and a second folding assembly 22. The first folding assembly 21 is inserted into and assembled with the base 1. The second folding assembly 22 is connected to the side of the first folding assembly 21 away from the base 1. The second folding assembly 22 can be unfolded and folded synchronously with the first folding assembly 21.

In one embodiment, the first folding assembly 21 includes a first folding plate 211, a second folding plate 212 and a first hinge member 213.

Specifically, one end of the first folding plate 211 is inserted into and assembled with the base 1, and the other end of the first folding plate is rotatably connected to the second folding assembly 22. The first folding plate 211 has a first mounting opening 2110. One end of the second folding plate 212 is rotatably connected to the second folding assembly 22, and the other end of the second folding plate penetrates through the first mounting opening 2110 to be inserted into and assembled with the base 1. The first folding plate 211 intersects with the second folding plate 212, and middle portions of the first folding plate 211 and the second folding plate 212 overlap. The first hinge member 213 penetrates through overlapping portions of the first folding plate 211 and the second folding plate 212, enabling the first folding plate 211 and the second folding plate 212 to be rotatably assembled. Apparently, the first folding plate 211 and the second folding plate 212 can rotate about the first hinge member 213, so as to be unfolded for use and folded for storage.

In one embodiment, insertion slots 110 are provided on the side of the base 1 proximal to the first folding assembly 21. Insertion portions 214 are provided on the sides of the first folding plate 211 and the second folding plate 212 proximal to the base. The insertion portions 214 are used to be assembled with the insertion slots 110, so as to realize the detachable assembly between the first folding assembly 21 and the frame 11.

In other embodiments, a detachable connection structure between the first folding assembly 21 and the base 1 may also be a clamping structure, a threaded connection structure, etc., as long as the first folding assembly 21 and the base 1 can be disassembled and assembled.

It should be noted that after the insertion slots 110 and the insertion portions 214 are assembled, a triangular support is formed between the first folding plate 211, the second folding plate 212 and the frame 11, which can effectively improve the stability of the assembly of the folding support frame 2 and the base 1.

In one embodiment, the width of the first folding plate 211 is greater than that of the second folding plate 212, so that after the first folding plate 211 and the second folding plate 212 are folded, the second folding plate 212 can be accommodated inside the first folding plate 211.

Further referring to FIGS. 1, 2, 4 to 6, in one embodiment, the first folding plate 211 includes a first lower mounting frame 2111, a first upper mounting frame 2112, first connecting plates 2113 and mesh structures 4.

Specifically, the first lower mounting frame 2111 is arranged on the side of the first connecting plates 2113 proximal to the base 1, and a lower end surface of the first lower mounting frame 2111 is flush with lower end surfaces of the first connecting plates 2113. The first upper mounting frame 2112 is arranged on the side of the first connecting plates 2113 away from the base 1, and an upper end surface of the first upper mounting frame 2112 is flush with upper end surfaces of the first connecting plates 2113. The first lower mounting frame 2111 and the first upper mounting frame 2112 are both internally provided with the mesh structures 4.

It should be noted that the upper end surface is an end surface of the side of the folding support frame 2 away from the base 1 in a folded state. The lower end surface is an end surface of the side of the folding support frame 2 proximal to the base 1 in a folded state. In a thickness direction D1 of the first connecting plates 2113, there is a height difference between the first lower mounting frame 2111 and the first upper mounting frame 2112, so that the second folding plate 212 can be accommodated in the first folding plate 211 after being folded. In a length direction L1 of the first connecting plates 2113, the first lower mounting frame 2111 and the first upper mounting frame 2112 are spaced apart, so that the first lower mounting frame 2111, the first upper mounting frame 2112 and the two first connecting plates 2113 arranged in parallel enclose to form the first mounting opening 2110.

In one embodiment, the second folding plate 212 includes a second lower mounting frame 2121, a second upper mounting frame 2122, second connecting plates 2123 and mesh structures 4.

The second lower mounting frame 2121 is arranged on the side of the second connecting plates 2123 proximal to the base 1, and a lower end surface of the second lower mounting frame 2121 is flush with lower end surfaces of the second connecting plates 2123. The second upper mounting frame 2122 is arranged on the side of the second connecting plates 2123 away from the base 1, and an upper end surface of the second upper mounting frame 2122 is flush with upper end surfaces of the second connecting plates 2123. The second lower mounting frame 2121 and the second upper mounting frame 2122 are both internally provided with the mesh structures 4. The upper end surface is an end surface of the side of the folding support frame 2 away from the base 1 in a folded state. The lower end surface is an end surface of the side of the folding support frame 2 proximal to the base 1 in a folded state.

Referring to FIGS. 1 and 4 to 9, in one embodiment, the second folding assembly 22 includes a third folding plate 221, a fourth folding plate 222 and a second hinge member 223.

One end of the third folding plate 221 is rotatably connected to the second folding plate 212. The third folding plate 221 has a second mounting opening 2210. One end of the fourth folding plate 222 penetrates through the second mounting opening 2210 to be rotatably connected to the first folding plate 211. The third folding plate 221 intersects with the fourth folding plate 222, and middle portions of the third folding plate 221 and the fourth folding plate 222 overlap. The second hinge member 223 penetrates through overlapping portions of the third folding plate 221 and the fourth folding plate 222, enabling the third folding plate 221 and the fourth folding plate 222 to be rotatably assembled. Apparently, the third folding plate 221 and the fourth folding plate 222 can rotate about the second hinge member 223, so as to be unfolded for use and folded for storage.

In one embodiment, the width of the third folding plate 221 is greater than that of the fourth folding plate 222, so that after the third folding plate 221 and the fourth folding plate 222 are folded, the fourth folding plate 222 can be accommodated inside the third folding plate 221.

In one embodiment, first connecting portions 215 are provided at the ends of the first folding plate 211 and the second folding plate 212 away from the base 1. Second connecting portions 224 are provided on the sides of the third folding plate 221 and the fourth folding plate 222 proximal to the base 1. The first connecting portions 215 and the second connecting portions 224 are rotatably connected, so that the first folding assembly 21 and the second folding assembly 22 can be unfolded and folded synchronously.

Further referring to FIGS. 1 and 4 to 7, in one embodiment, the third folding plate 221 includes a third lower mounting frame 2211, a third upper mounting frame 2212, third connecting plates 2213 and mesh structures 4.

The third lower mounting frame 2211 is arranged on the side of the third connecting plates 2213 proximal to the base 1, and a lower end surface of the third lower mounting frame 2211 is flush with lower end surfaces of the third connecting plates 2213. The third upper mounting frame 2212 is arranged on the side of the third connecting plates 2213 away from the base 1, and an upper end surface of the third upper mounting frame 2212 is flush with upper end surfaces of the third connecting plates 2213. The third lower mounting frame 2211 and the third upper mounting frame 2212 are both internally provided with the mesh structures 4.

It should be noted that the upper end surface is an end surface of the side of the folding support frame 2 away from the base 1 in a folded state. The lower end surface is an end surface of the side of the folding support frame 2 proximal to the base 1 in a folded state. In a thickness direction D2 of the third connecting plates 2213, there is a height difference between the third lower mounting frame 2211 and the third upper mounting frame 2212, so that the fourth folding plate 222 can be accommodated in the third folding plate 221 after being folded. In a length direction L2 of the third connecting plates 2213, the third lower mounting frame 2211 and the third upper mounting frame 2212 are spaced apart, so that the third lower mounting frame 2211, the third upper mounting frame 2212 and the two third connecting plates 2213 arranged in parallel enclose to form the second mounting opening 2210.

In one embodiment, the fourth folding plate 222 includes a fourth lower mounting frame 2221, a fourth upper mounting frame 2222, fourth connecting plates 2223 and mesh structures 4.

Specifically, the fourth lower mounting frame 2221 is arranged on the side of the fourth connecting plates 2223 proximal to the base 1, and a lower end surface of the fourth lower mounting frame 2221 is flush with lower end surfaces of the fourth connecting plates 2223. The fourth upper mounting frame 2222 is arranged on the side of the fourth connecting plates 2223 away from the base, and an upper end surface of the fourth upper mounting frame 2222 is flush with upper end surfaces of the fourth connecting plates 2223. The fourth lower mounting frame 2221 and the fourth upper mounting frame 2222 are both internally provided with the mesh structures 4. It should be noted that the upper end surface is an end surface of the side of the folding support frame 2 away from the base 1 in a folded state. The lower end surface is an end surface of the side of the folding support frame 2 proximal to the base 1 in a folded state.

Referring to FIGS. 1 and 4 to 9, in one embodiment, the folding support frame 2 further includes at least one third folding assembly 23. One end of the third folding assembly 23 is rotatably connected to the first connecting portions 215, and the other end of the third folding assembly is rotatably connected to the second connecting portions 224. The third folding assembly 23 can be unfolded and folded synchronously with the first folding assembly 21 and the second folding assembly 22.

In this embodiment, a third folding assembly 23 is provided. In other embodiments, multiple third folding assemblies 23, such as two, three, four, etc., are provided. The multiple third folding assemblies 23 can be unfolded or folded synchronously after being connected, so that the folding support frame 2 can be stored as a whole. It should be noted that the specific number of the third folding assembly 23 can be set according to practical requirements, and it is only required that the first folding assembly 21 and the second folding assembly 22 can be unfolded or folded synchronously.

It should be noted that after the first folding assembly 21, the second folding assembly 22 and the third folding assembly 23 are connected, the first folding assembly 21, the second folding assembly 22 and the third folding assembly 23 enclose to form a rhombic accommodating space 24, and the rhombic accommodating space 24 can be used to store items or books. It is worth noting that since the second folding assembly 22 is located at a top of the folding support frame 2, a V-shaped accommodating space 25 enclosed by the third folding plate 221 and the fourth folding plate 222 is formed at the top of the second folding assembly 22, which can also be used to store items or books. The folding support frame 2 arranged in this way has multiple accommodating spaces, realizing the multi-space storage of books or items, thereby significantly improving the storage capacity of the folding support frame 2.

In one embodiment, the third folding assembly 23 includes a fifth folding plate 231, a sixth folding plate 232 and a third hinge member 233.

One end of the fifth folding plate 231 is rotatably connected to the first connecting portions 215 on the second folding plate 212, and the other end of the fifth folding plate is rotatably connected to the second connecting portions 224 on the fourth folding plate 222. The fifth folding plate 231 has a third mounting opening 2310. One end of the sixth folding plate 232 is rotatably connected to the first connecting portions 215 on the first folding plate 211, and the other end of the sixth folding plate penetrates through the third mounting opening 2310 to be rotatably connected to the second connecting portions 224 on the third folding plate 221. The sixth folding plate 232 intersects with the fifth folding plate 231, and middle portions of the sixth folding plate 232 and the fifth folding plate 231 overlap. The third hinge member 233 penetrates through overlapping portions of the fifth folding plate 231 and the sixth folding plate 232, enabling the fifth folding plate 231 and the sixth folding plate 232 to be rotatably assembled. Apparently, the fifth folding plate 231 and the sixth folding plate 232 can rotate about the third hinge member 233, so as to be unfolded for use and folded for storage.

In one embodiment, the width of the fifth folding plate 231 is greater than that of the sixth folding plate 232, so that after the fifth folding plate 231 and the sixth folding plate 232 are folded, the sixth folding plate 232 can be accommodated inside the fifth folding plate 231.

Further referring to FIGS. 1 and 4 to 9, in one embodiment, the fifth folding plate 231 includes a fifth lower mounting frame 2311, a fifth upper mounting frame 2312, fifth connecting plates 2313 and mesh structures 4.

The fifth lower mounting frame 2311 is arranged on the side of the fifth connecting plates 2313 proximal to the base 1, and a lower end surface of the fifth lower mounting frame 2311 is flush with lower end surfaces of the fifth connecting plates 2313. The fifth upper mounting frame 2312 is arranged on the side of the fifth connecting plates 2313 away from the base 1, and an upper end surface of the fifth upper mounting frame 2312 is flush with upper end surfaces of the fifth connecting plates 2313. The fifth lower mounting frame 2311 and the fifth upper mounting frame 2312 are both internally provided with the mesh structures 4.

It should be noted that the upper end surface is an end surface of the side of the folding support frame 2 away from the base 1 in a folded state. The lower end surface is an end surface of the side of the folding support frame 2 proximal to the base 1 in a folded state. In a thickness direction D3 of the fifth connecting plates 2313, there is a height difference between the fifth lower mounting frame 2311 and the fifth upper mounting frame 2312, so that the sixth folding plate 232 can be accommodated in the fifth folding plate 231 after being folded. In a length direction L3 of the fifth connecting plates 2313, the fifth lower mounting frame 2311 and the fifth upper mounting frame 2312 are spaced apart, so that the fifth lower mounting frame 2311, the fifth upper mounting frame 2312 and the two fifth connecting plates 2313 arranged in parallel enclose to form the third mounting opening 2310.

In one embodiment, the sixth folding plate 232 includes a sixth lower mounting frame 2321, a sixth upper mounting frame 2322, sixth connecting plates 2323 and mesh structures 4.

The sixth lower mounting frame 2321 is arranged on the side of the sixth connecting plates 2323 proximal to the base 1, and a lower end surface of the sixth lower mounting frame 2321 is flush with lower end surfaces of the sixth connecting plates 2323. The sixth upper mounting frame 2322 is arranged on the side of the sixth connecting plates 2323 away from the base 1, and an upper end surface of the sixth upper mounting frame 2322 is flush with upper end surfaces of the sixth connecting plates 2323. The sixth lower mounting frame 2321 and the sixth upper mounting frame 2322 are both internally provided with the mesh structures 4. The upper end surface is an end surface of the side of the folding support frame 2 away from the base 1 in a folded state. The lower end surface is an end surface of the side of the folding support frame 2 proximal to the base 1 in a folded state.

In one embodiment, third connecting portions 234 are provided on the sides of the fifth folding plate 231 and the sixth folding plate 2323 away from the base 1. Fourth connecting portions 235 are provided on the sides of the fifth folding plate 231 and the sixth folding plate 2323 proximal to the base 1. The third connecting portions 234 are rotatably connected to the second connecting portions 224 by means of bolts. The fourth connecting portions 235 are rotatably connected to the first connecting portions 215 also by means of bolts. When the folding support frame 2 arranged in this way is unfolded, the bolts at various connections need to be loosened first so that the first folding plate 211, the second folding plate 212, the third folding plate 221, the fourth folding plate 222, the fifth folding plate 231 and the sixth folding plate 232 can rotate. Thus, the unfolded angle between the folding plates can be adjusted, and after the adjustment of the angle between the folding plates is completed, the bolts are tightened to fix the positions of the folding plates, thus completing the unfolding of the folding support frame 2. When storing, it is only necessary to loosen the bolts at each connection again, and the folding plates can fold up under the action of their own gravity.

In this embodiment, the first hinge member 213, the second hinge member 223 and the third hinge member 233 are all bolt structures, so that a user can control the degree of tightness of hinges by controlling the degree of tightness of the bolt structures.

In one embodiment, movable baffles 20 are arranged on the side of the first folding plate 211 and the second folding plate 212 proximal to the base 1, the side of the third folding plate 221 and the fourth folding plate 222 proximal to the base 1 and the side of the fifth folding plate 231 and the sixth folding plate 232 proximal to the base 1. Multiple movable baffles 20 are arranged correspondingly. The multiple movable baffles 20 are rotatably assembled with the first connecting plates 2113, the second connecting plates 2123, the third connecting plates 2213, the fourth connecting plates 2223, the fifth connecting plates 2313 and the sixth connecting plates 2323 respectively.

Referring to FIGS. 1, 4, 7, 8 and 13, in one embodiment, each movable baffle 20 includes a baffle frame 201, a rotary shaft 202 and a mesh structure. The mesh structure is arranged inside the baffle frame 201. The rotary shaft 202 is fixedly connected to the baffle frame 201, and the mounting position of the rotary shaft 202 is at a distance from an edge of the baffle frame 201, so that each baffle frame 201 abuts against the corresponding first folding plate 211, second folding plate 212, third folding plate 221, fourth folding plate 222, fifth folding plate 231 and sixth folding plate 232 when unfolded, so as to limit the unfolded angle of the movable baffle 20.

It should be noted that when in an unfolded state, the movable baffles 20 are perpendicular to the corresponding first folding plate 211, second folding plate 212, third folding plate 221, fourth folding plate 222, fifth folding plate 231 and sixth folding plate 232, so that V-shaped accommodating spaces 200 are formed between the first folding plate 211 and the movable baffle 20 and between the second folding plate 212 and the movable baffle 20. Books can be accommodated in the V-shaped accommodating spaces 200.

From the above description, it can be seen that the above embodiment of the present disclosure achieves the following technical effects:

1) The folding support frame 2 and the base 1 are detachably assembled, so that the folding support frame 2 can be detached from the base 1 first and then is folded and stored in the storage cavity of the base 1; with this configuration, the bookshelf is not only easy to fold and store, convenient to assemble and disassemble, and stable in structure stability, but also capable of further accommodating the folding support frame 2, thereby occupying less space after being folded and stored.

2) The movable baffles 20 are arranged to form the V-shaped accommodating spaces 200 with the first folding plate 211, the second folding plate 212, the third folding plate 221, the fourth folding plate 222, the fifth folding plate 231 and the sixth folding plate 232 for accommodating books; and the movable baffles 20 can be folded and stored toward the sides where the folding plates are located, thereby being simple in structure, easy to store and quick and convenient to unfold and fold. When the movable baffles 20 are in an unfolded state, the V-shaped accommodating spaces 200 are formed on the folding support frame 2 to increase a storage space of the folding support frame 2, thereby significantly improving the storage capacity of the folding support frame 2.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure should be included in the scope of protection of the present disclosure.

The invention claimed is:

1. A detachable folding bookshelf, comprising:
   a base having a storage cavity, and
   a folding support frame detachably assembled with the base, wherein the folding support frame has an unfolded state and a folded state, and when in the folded state, the folding support frame is capable of being received within the storage cavity;
   wherein the folding support frame comprises:
   a first folding assembly inserted into and assembled with the base; and
   a second folding assembly connected to one side of the first folding assembly, the second folding assembly being capable of being unfolded or folded synchronously with the first folding assembly;
   wherein the first folding assembly comprises:
   a first folding plate with one end inserted into and assembled with the base and another end rotatably connected to the second folding assembly, the first folding plate having a first mounting opening;
   a second folding plate with one end rotatably connected to the second folding assembly and another end extending through the first mounting opening to be inserted into and assembled with the base, wherein the first folding plate intersects with the second folding plate, and middle portions of the first folding plate and the second folding plate overlap; and
   a first hinge member extending through overlapping portions of the first folding plate and the second folding plate to enable the first folding plate and the second folding plate to be rotatably assembled.

2. The detachable folding bookshelf according to claim 1, wherein insertion slots are provided on one side of the base, the first folding plate and the second folding plate are both provided with insertion portions, and the insertion portions are adapted to the insertion slots.

3. The detachable folding bookshelf according to claim 1, wherein the second folding assembly comprises:
   a third folding plate with one end rotatably connected to the second folding plate, the third folding plate having a second mounting opening;
   a fourth folding plate with one end extending through the second mounting opening to be rotatably connected to the first folding plate, wherein the third folding plate intersects with the fourth folding plate, and middle portions of the third folding plate and the fourth folding plate overlap; and
   a second hinge member extending through overlapping portions of the third folding plate and the fourth folding plate to enable the third folding plate and the fourth folding plate to be rotatably assembled.

4. The detachable folding bookshelf according to claim 3, wherein one end of the first folding plate and one end of the second folding plate each is provided with two first connecting portions respectively, one end of the third folding plate and one end of the fourth folding plate each is provided with two second connecting portions respectively, and the first connecting portions and the second connecting portions are capable of being rotatably connected to allow the first folding assembly and the second folding assembly to be unfolded or folded.

5. The detachable folding bookshelf according to claim 4, wherein the folding support frame further comprises at least one third folding assembly, one end of the at least one third folding assembly is rotatably connected to the first connecting portions, another end of the at least one third folding assembly is rotatably connected to the second connecting portions, and the at least one third folding assembly is capable of being unfolded or folded synchronously with the first folding assembly and the second folding assembly.

6. The detachable folding bookshelf according to claim 5, wherein the at least one third folding assembly comprises:
   a fifth folding plate with one end rotatably connected to the second folding plate and another end rotatably connected to the fourth folding plate, the fifth folding plate having a third mounting opening;
   a sixth folding plate with one end rotatably connected to the first folding plate and another end extending through the third mounting opening to be connected to the third folding plate, wherein the sixth folding plate intersects with the fifth folding plate, and middle portions of the sixth folding plate and the fifth folding plate overlap; and
   a third hinge member extending through overlapping portions of the fifth folding plate and the sixth folding plate to enable the fifth folding plate and the sixth folding plate to be rotatably assembled.

7. A detachable folding bookshelf, comprising:
   a base having a storage cavity, and
   a folding support frame detachably assembled with the base, wherein the folding support frame has an unfolded state and a folded state, and when in the folded state, the folding support frame is capable of being received within the storage cavity;
   the detachable folding bookshelf further comprising movable baffles, wherein the movable baffles are rotatably assembled with the folding support frame, and when the folding support frame is in the unfolded state, the movable baffles are capable of being unfolded relative to the folding support frame to define V-shaped accommodating spaces together with the folding support frame, so as to increase the capacity of the bookshelf.

* * * * *